United States Patent [19]
Calkin et al.

[11] 3,736,495
[45] May 29, 1973

[54] SWITCHING REGULATOR WITH HIGH EFFICIENCY TURNOFF LOSS REDUCTION NETWORK

[75] Inventors: Edwin Theodore Calkin, Parsippany; Billy Harold Hamilton, Summit; Frank Carl La Porta, Livingston, all of N.J.

[73] Assignee: Bell Telephone Laboratories, Incorporated, Murray Hill, N.J.

[22] Filed: Mar. 22, 1972

[21] Appl. No.: 236,833

[52] U.S. Cl.................323/17, 307/297, 317/33 VR, 323/22 T, 323/DIG. 1
[51] Int. Cl..............................................G05f 1/56
[58] Field of Search ................323/17, 22 T, DIG. 1; 317/33 VR; 307/297

[56] References Cited
UNITED STATES PATENTS
3,670,233  6/1972  Zellmer et al................323/DIG. 1 X FOREIGN PATENTS OR APPLICATIONS
1,939,459  2/1970  Germany........................323/DIG. 1

OTHER PUBLICATIONS
Solid State Design; "Considerations in the Design of Switching Type Regulators" by Loucks, pg. 30–34; April 1963

Primary Examiner—Gerald Goldberg
Attorney—R. J. Guenther and William L. Keefauver

[57] ABSTRACT

A switching regulator includes a turnoff loss reduction network to reduce switching losses in the switching transistor during turnoff. A capacitive energy storage device is discharged during the turnoff of the switching transistor to retard the collector-emitter voltage rise. The regulator, in addition, includes a charging network to losslessly charge the capacitive energy storage device.

4 Claims, 7 Drawing Figures

SWITCHING REGULATOR WITH HIGH EFFICIENCY TURNOFF LOSS REDUCTION NETWORK

BACKGROUND OF THE INVENTION

This invention relates to power supplies and, more particularly, to improving the efficiency of switching-type regulators. It is particularly concerned with the reduction of power losses in the regulator due to the turnoff of the switching transistor.

A typical switching regulator of the prior art such as is shown in FIG. 1 utilizes a switching transistor 110 to intermittently connect an input power source 101 to an output load 109. The switching of the switching transistor 110 is controlled by a base drive control 105, which controls the conduction in the switching transistor 110. The base drive control 105 may comprise some external control source or it may comprise a feedback circuit arrangement to regulate the output of the regulator in either a current or a voltage mode or a combination thereof. Regulation feedback circuits to accomplish this switching control are well known to those skilled in the power supply art and hence it is not believed necessary to describe it in detail.

The load current to the output load 109 is sustained by a flyback inductor 107 during the nonconductive periods of the transistor 110. The sustained load current or flyback current flows, via the flyback diode 106 through the flyback inductor 107 to the load 109. The duty cycle ratio determined by the ratio of the conducting to nonconducting periods of the transistor 110 determines the magnitude of the output signal appearing at the load 109.

The signal response of the switching transistor 110 as it is being turned off is shown in FIG. 2A. As is apparent from the FIG. 2A, prior to turnoff the transistor 110 is saturated and little or no voltage drop appears across its collector-emitter path. As the transistor 110 begins to drop out of saturation and the current $i_c$ has decreased slightly from its saturated value I, the voltage $v_{ce}$ across the collector-emitter path of transistor 110 rises quickly to its cutoff value V. This voltage V appears across the collector-emitter path of transistor 110 while the current $i_c$ flowing therethrough is still decaying. The transistor current $i_c$ at the high voltage drop causes a considerable power dissipation within the transistor 110.

The switching loci of the transistor 110 is illustrated in FIG. 2B. As the transistor 110 begins to turn off, the collector-emitter voltage rises to its full value V and continues at this full value across the transistor 110 as the current $i_c$ decays therein to zero. The power loss due to this voltage drop may cause heat dissipation problems in the regulator and especially in the transistor 110. The regulator design may require a high power switching transistor just to accommodate this switching loss.

It is therefore an object of the invention to improve the efficiency of switching in a switching regulator.

It is another object of the invention to reduce the power loss in a switching regulator due to switching operations and improve the overall operating efficiency.

SUMMARY OF THE INVENTION

Therefore, in accord with the invention, a switching regulator is designed to include a turnoff loss reduction network to reduce turnoff power losses occurring in the switching transistor. The turnoff loss reduction network comprises a capacitive energy storage device connected in a path which shunts the flyback diode of the switching regulator. The capacitive energy storage device is also connected to the collector of the switching transistor. This capacitor is charged during turnon and conduction of the switching transistor. During the turnoff of the switching transistor, this capacitive energy storage device is discharged to suppress, for the turnoff duration, the abrupt collector-to-emitter voltage rise in the switching transistor which would otherwise occur.

The efficiency of the switching regulator is further improved by a charging arrangement to losslessly charge the capacitive energy storage device in the turnoff loss reduction network. This charging network includes a current source which slowly recharges the capacitor while the switching transistor is conductive.

BRIEF DESCRIPTION OF THE DRAWINGS

An understanding of the invention may be readily attained by reference to the following detailed description and the acompanying drawing in which.

DETAILED DESCRIPTION

Figure 1:
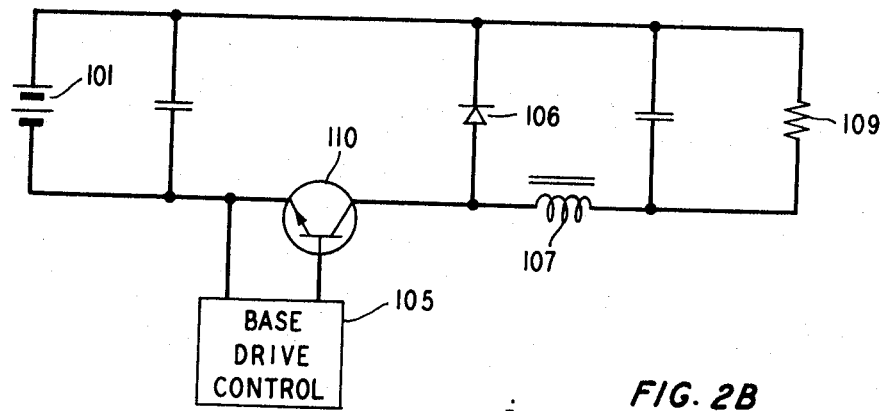
FIG. 1 is a schematic of a switching regulator existing in the prior art and described hereinabove.
Figure 3:
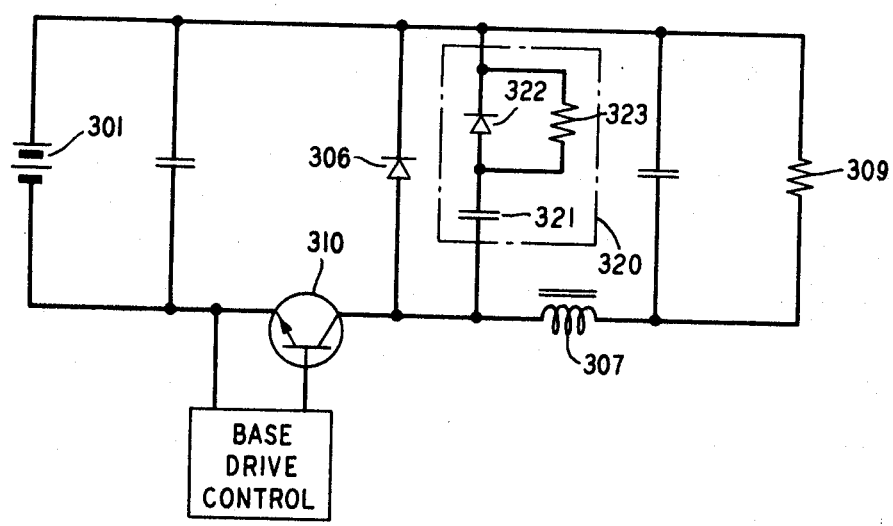
FIG. 3 is a schematic of a switching regulator with a turnoff loss reduction network.

The switching regulator shown in FIG. 3 is similar to that shown in FIG. 1. It additionally has a turnoff loss reduction network 320 added to reduce the turnoff switching losses of the switching transistor 310. The switching regulator in FIG. 3 operates identically to the regulator shown in FIG. 1 and hence a detailed description of its operation is believed unnecessary.

The turnoff loss reduction network 320 comprises a capacitor 321, a diode 322 and a resistor 323. The turnoff loss reduction network is connected in shunt across the flyback diode 306. It operates to reduce the turnoff switching loss in the switching transistor 310 by retarding the collector-to-emitter voltage rise across the transistor 310 during its turnoff transition period. It retards this voltage rise by discharging slowly into the output load 309 of transistor 310 as it turns off.

The capacitor 321 is charged by the input voltage source 301, via the resistor 323, prior to the turnoff of transistor 310. As the transistor 310 begins to turn off, the collector-emitter current begins to decrease. The flyback inductor 307 induces a voltage to maintain a steady current flow through the output load 309. At this instant the flyback diode 306 is reverse-biased by the voltage across the charged capacitor 321. As the collector current of the switching transistor 310 decreases, the difference between the collector current and the flyback inductor current is supplied by the discharging of the stored charge in the capacitor 321. At this time the collector-emitter voltage across the transistor 310 is determined by the difference between the input voltage of the source 301 and the voltage across the capacitor 321. As the voltage across capacitor 321 falls, the collector-emitter voltage across transistor 310 rises. However, the voltage stored in the capacitor 321 has delayed the collector-emitter voltage rise for a time period sufficient to let the current flowing through the transistor fall to a very small value.

Figure 2A:
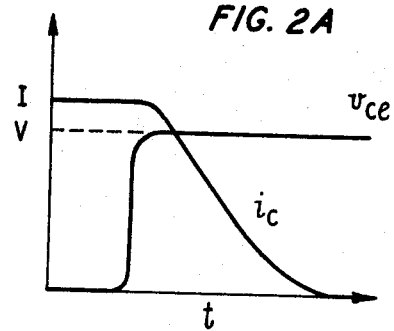
FIGS. 2A and 2B illustrate switching waveforms and switching loci to show the time signal relation of the collector current and collector-emitter voltage during the turnoff of the switching transistor in FIG. 1.
Figure 2B:
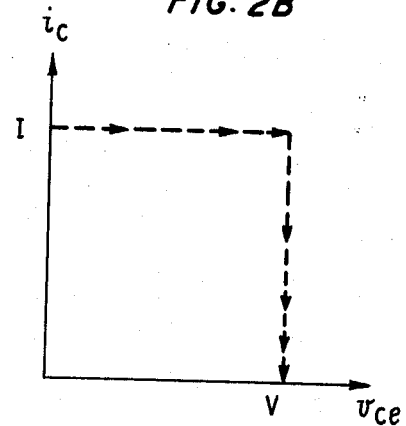
Figure 4A:
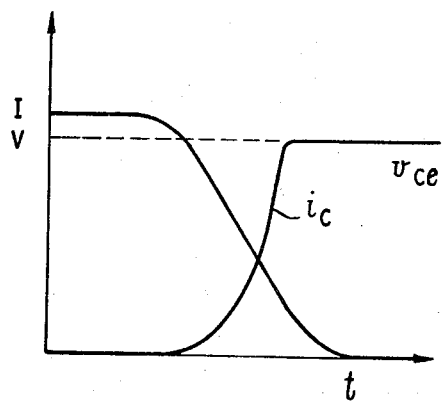
FIGS. 4A and 4B illustrate switching waveforms and timing diagrams to show the time signal relation of the collector current and the collector-emitter voltage during the turnoff of the switching transistor in the circuit of FIG. 3.
Figure 4B:
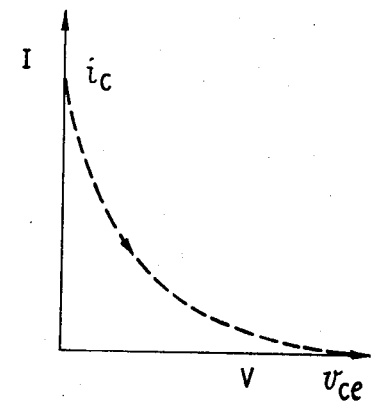

The effect of this turnoff loss reduction network may be readily ascertained by reference to FIGS. 4A and 4B wherein it is apparent as the collector current $i_c$ of transistor 310 begins to decay, the collector-to-emitter voltage does not rise to its full value until the current $i_c$ has fallen to nearly zero. The relative efficiency improvement may be readily ascertained by comparing the area under the switching loci in FIG. 4B with the area under the switching loci in FIG. 2B.

The charge stored in the capacitor 321 is supplied by the input voltage source 301 which charges the capacitor 321, via the resistor 323, while the transistor 310 is conducting. The capacitor 321 is charged to a voltage equaling the input voltage. During this charging process, however, considerable energy is dissipated in the resistor 323. The power dissipation in the resistor 323 reduces the efficiency of the switching regulator and may, in addition, dissipate power in the form of heat which may be adverse to the performance of the rest of the circuit. In addition the current charging the capacitor 321 flows through the switching transistor 310 causing a collector current peak therein in excess of the normal load current.

Figure 5:
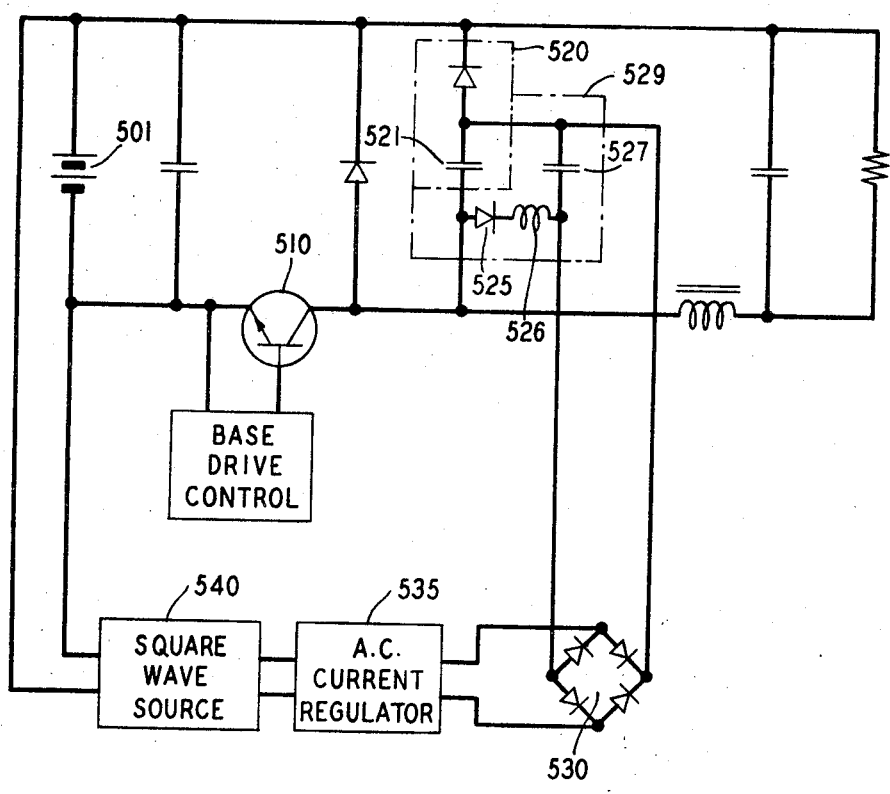
FIG. 5 is a schematic of a switching regulator with a high efficiency charging network to charge the capacitive storage device in the turnoff loss reduction network.

The switching regulator shown in FIG. 5 overcomes this power dissipation in the charging resistor by charging the capacitor 521 with a trickle current source. The trickle current source charges the capacitor by a constant current limited by a reactive network or a switching regulator with very little power loss due to dissipation. This low loss charging network comprises a square wave oscillatory signal source 540, which is powered by the input voltage source 501. The output of the square wave signal source 540 is applied to an AC current regulator 535 which regulates the square wave signal at a constant magnitude. The current regulator 535 may comprise a saturable reactor or a switching regulator. The regulated current signal is applied to a rectifier bridge 530. The output of the rectifier bridge 530 represents a high ripple signal of uniform polarity. This signal is applied to a trickle-charging network 529 comprising a series connection of a diode 525, an inductor 526 and a capacitor 527. This series connection shunts the capacitor 521 of the turnoff loss reduction network 520. The charging of the capacitor 521 occurs during the ON time of the switching transistor 510. The trickle-charging network 529 filters the high ripple signal and applies a constant charging current to the capacitor 521. By charging the capacitor 521 at a uniform rate, the voltage of the input source 501 may be used to supply the charging current to the capacitor 521. The steady rate of the charging current permits a rapid uniform charging of the capacitor 521. The filtering action of the inductor 526 and the capacitor 527 averages the energy supplied by the current source, and thus, minimizes the peak power which it must supply. The trickle-charging network 529 advantageously eliminates collector current peaks in the switching transistor 510 because the charging current does not flow in switching transistor 510.

What is claimed is:

1. A switching regulator circuit comprising a pair of input terminals to which a source of energy may be connected, a pair of output terminals, a switching transistor to couple one of said input terminals to one of said output terminals, a flyback diode, a series connected capacitor and a second diode shunting said flyback diode, said second diode poled in the same direction as said flyback diode, a capacitor charging path coupling one of said input terminals to said capacitor and bypassing said second diode and said switching transistor, said capacitor charging path comprising an oscillating signal source coupled across said input terminals, means to current regulate said signal source, means to rectify the output of said means to regulate and charging means to derive a constant current from the output of said means to rectify and apply the rectified output to said capacitor.

2. A switching regulator circuit as defined in claim 1 wherein said charging means comprises a series connection of a third diode, a charging inductor and a filter capacitor shunting said capacitor, said rectified output being applied across said filter capacitor.

3. A regulator circuit including a switching transistor intermittently driven into alternating conducting and nonconducting states, and an output circuit including a flyback diode and a flyback inductor, a first capacitor shunting said flyback diode to discharge slowly as said transistor changes from a conducting to a nonconducting state, means to charge said first capacitor when said transistor is in a conducting state including a current source, said current source including a charging inductor, a charging capacitor and a charging diode connected in a series connection, said series connection shunting said first capacitor whereby said charging inductor controls a steady trickle current to continuously charge said first capacitor.

4. A regulator circuit as defined in claim 3 further including an input circuit and wherein said current source further includes an oscillator signal source, a current regulator and a rectifier coupling said input circuit to said charging inductor and said charging capacitor.

* * * * *